No. 688,923.　　　　　　　　　　　　　　　　Patented Dec. 17, 1901.
G. W. BLAIR & H. J. HAYS.
METHOD OF MAKING HOLLOW GLASS ARTICLES.
(Application filed Nov. 19, 1897.)

(No Model.)

WITNESSES:
L. H. Connery
F. E. Harpell

INVENTORS:
George W. Blair
Harry J. Hays
by James K. Bakewell
their Attorney.

UNITED STATES PATENT OFFICE.

GEORGE W. BLAIR, OF PITTSBURG, AND HARRY J. HAYS, OF BALDWIN TOWNSHIP, PENNSYLVANIA.

METHOD OF MAKING HOLLOW GLASS ARTICLES.

SPECIFICATION forming part of Letters Patent No. 688,923, dated December 17, 1901.

Application filed November 19, 1897. Serial No. 659,091. (No model.)

*To all whom it may concern:*

Be it known that we, GEORGE W. BLAIR, of Pittsburg, and HARRY J. HAYS, of Baldwin township, in the county of Allegheny and State of Pennsylvania, have invented a new and useful Improvement in Methods of Making Hollow Glass Articles, of which the following is a full, clear, and exact description, reference being had to the accompanying drawings, forming part of this specification, in which—

Figure 1:
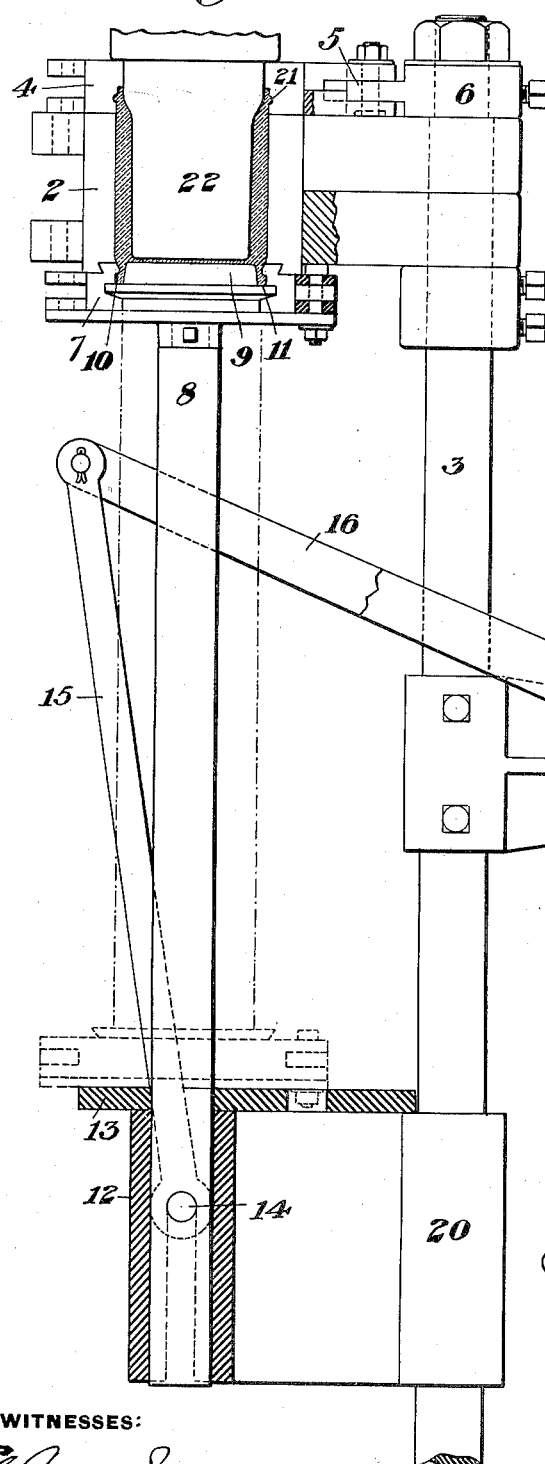
Figure 3:
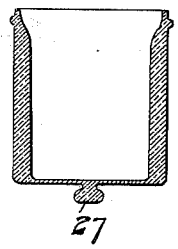
Figure 2:
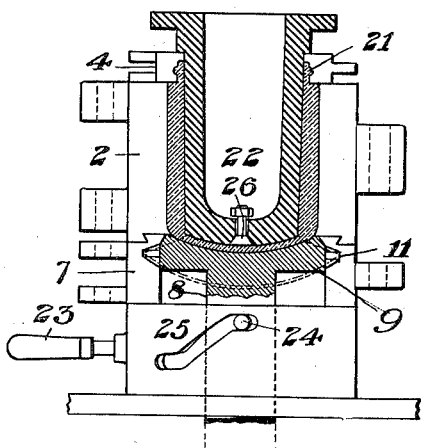

Figure 1 is a partial side elevation, partly in section, showing one form of apparatus for carrying out our invention. Fig. 2 is a sectional view of a modified form of blank and the mold used in its manufacture, and Fig. 3 is a sectional view of a modified form of blank.

Our invention relates to the manufacture of hollow articles of glassware; and it is designed to greatly cheapen and improve the manufacture of such articles.

To this end it consists in forming a hollow blank and then elongating the blank by drawing on or approximately on the lines of its outer circumference.

In the manufacture of hollow articles of glassware by first forming a blank and then drawing the soft glass of the blank into cylindrical form in order to produce a uniform shape it is desirable that the lines of strain on the glass should be parallel—that is, that the pulling of the plastic glass between the ends of the blank should be on parallel lines, whereby any possible tendency toward the collapsing of the cylinder is prevented. To this end we may secure the blank to a stretcher at points at or near the lines of its outer circumference, or we form a blank having one end of glass that is relatively thinner than the sides of the blank, which end is preferably closed by the thin glass, so that the end will harden and stiffen, while the sides, having the greater quantity of glass, remain soft and plastic and while the end is so hardened and the sides soft elongate the blank to the desired size and shape, the stiffened end of the blank keeping the lines of force extended throughout to the outer circumference of the blank.

We will now describe our invention, so that others skilled in the art may use the same.

In the drawings, 2 represents a sectional press-mold hinged to and carried upon a suitable standard 3. On top or at one end of the mold is the sectional mold-ring 4, the parts of which are hinged to a lug 5, projecting from a ring 6, secured to the standard 3. The other ring 7 of the mold is hinged upon a cross piece or head on the end of the supporting-rod 8, which also carries the base-piece 9 of the mold. This end ring is provided on its interior circumference with an annular projection 10, forming an annular recess 11 directly above the base-piece 9. The rod 8 moves within a guide 12 in a suitable table 13 and is supported and moved by a pin 14, which extends through slots in the guide and at its ends is pivotally connected by links 15 with levers 16, which are secured at their outer ends to a shaft 17. The shaft 17 is carried in suitable bearings in a bracket 18, which is secured to the support 3, and is rotated by a handle 19. The table 13 may be carried on the support 3 by means of a suitable collar 20. The end mold-ring 4 is provided with a recess 21 on its inner circumference, in which a projecting ring is formed upon the glass blank when the blank is pressed. The plunger 22 of the mold is fitted on a press in the usual manner, so as to reciprocate within the mold, and is sufficiently tapered to withdraw easily from the mold after the glass is pressed. This plunger is of such shape that when it has entered the mold there is left, preferably, a smaller space between the plunger and the base-piece 9 than between the plunger and the sides of the mold.

The operation is as follows: The parts of the mold being in the position shown in the drawings and the plunger being raised, a suitable quantity of molten glass is dropped into the mold-cavity. The plunger 22 is then depressed, and the glass is forced into all parts of the mold-cavity, thus securing one end of the blank to one end mold-ring in the recess 21 and the other end of the blank to the other mold-ring in the recess 11, the closed end of the blank being composed of glass relatively thinner than the sides of the blank, which thin portion of glass quickly hardens and stiffens against the base-piece 9. The plunger 22 is then withdrawn, and the parts of the mold 2 are separated and moved apart, so as to release them from the blank. The base-piece 9 and the end ring 7, to which one end of the blank is secured by the glass in the recess 11, are moved away from the fixed end ring 4 by the rod 8, whereby the blank may be elongated into a cylinder, (indicated by the dotted lines in Fig. 1,) which cylinder is readily released from the two end rings of the mold and is suitable for cracking and forming into window-glass. Instead of thus drawing out the glass blank in the form of a cylinder it may be made into articles of other form—such as molded lamp-chimneys, globes, &c.—by inclosing the blank during or after the stretching operation in the mold having a matrix of the desired form and expanding and elongating the blank within such matrix.

In the operation just described it is advisable to use air-blowing in connection with the pressing or drawing of the cylinder, whereby sufficient air is supplied to the interior of the cylinder as it is drawn to insure the prevention of bending or collapsing of the glass, and to this end the plunger may be provided with an air-orifice and a channel for the passage of air to the interior of the blank. We prefer, however, in such case to employ the modified form of plunger and mold shown in Fig. 2, in which the base 9 is movable and is reciprocated by the handle 23 and the pin 24, which moves in a slot in a post 25. The plunger 22 is hollow and is provided with an air-valve 26. Suitable air connections are made with the hollow plunger. Molten glass having been placed in the cavity of the mold, the base 9 being in its closed position, the plunger is caused to enter the mold and press the blank in the manner already described. The base 9 is then moved sufficiently to expose the recess 11. The plunger is retracted somewhat, so as to free the glass, and air is caused to pass through the valve 26, which blows the glass forming the closed end of the blank into the recess 11 and against the base 9, thereby thinning and chilling the glass and forming a blow-over in the recess 11, that affords a secure attachment of the end of the blank to the rod 8 and one that is easily cracked off when the cylinder is formed. The air may be continued to be supplied during the formation of the cylinder. In Fig. 3 we show another form of blank, in which the attachment of the blank to the base 9 is caused by the pressing of a button 27 in a recess in the base. In this case although the point of attachment to the drawing-rod 8 is on a vertical line with the center of the cylinder yet owing to the chilling of the portion of glass closing the end of the cylinder the drawing force is exerted on substantially the lines of the circumference of the blank. Where the grip is formed by pressing a lip or when other means of effecting a grip around the periphery of the lower end of the blank is employed, the described thinness of the glass at the lower end becomes unessential, though its use may be advantageous. The use of such a thin portion at the lower end is essential only when it is desired that a pulling force applied at or near the center of a blank like that of Fig. 3 shall be transmitted to the periphery of the lower end of the blank, so as to be practically operative as a pulling force substantially in the vertical annular plane of the blank.

The advantages of our invention will be apparent to those skilled in the art, since in the operation of forming hollow glass articles (whether such articles be afterward changed in form—as, for instance, by cracking and flattening into a sheet—or be in final form, as where a mold having a mold-cavity in the form of a finished article is placed about the blank and the blank expanded therein) uniformity in the drawing of the blank is insured and rapidity and certainty of operation are obtained.

Although we have described the use of apparatus of improved construction for the practice of our method, we do not desire to limit ourselves thereto, as a great variety of means may be employed for such purpose.

We claim—

1. The method of forming hollow glass articles, which consists in forming a hollow blank and while at least a portion of the sides of the blank is out of contact laterally with the matrix in which it was formed and a portion of the blank is still held thereby, elongating the blank by drawing or pulling the same solely on the lines of its circumference.

2. The method of forming hollow glass articles, which consists in forming a hollow blank and while at least a portion of the sides of the blank is out of lateral contact with the matrix in which it was formed and a portion of the blank is still held thereby, elongating the blank by drawing or pulling the same solely on the lines of its circumference; and forcing air into the interior of the blank during such drawing or pulling.

In testimony whereof we have hereunto set our hands.

GEORGE W. BLAIR.
HARRY J. HAYS.

Witnesses:
JAMES K. BAKEWELL,
G. I. HOLDSHIP.